United States Patent
Helmrichs

[19]

[11] Patent Number: 6,079,113
[45] Date of Patent: Jun. 27, 2000

[54] ELECTRONIC RADIUS GAUGE

[76] Inventor: Terry L. Helmrichs, 218 Devlin Cir., Cedar Falls, Iowa 50613-6343

[21] Appl. No.: 09/040,683

[22] Filed: Mar. 18, 1998

[51] Int. Cl.$^7$ .................................................. G01B 7/28
[52] U.S. Cl. ........................ 33/555.1; 33/542; 33/544.6; 33/708
[58] Field of Search .................... 33/542, 555.1, 33/544.4, 544.5, 544.6, 555.2, 555.3, 543, 544, 546, 1 PT, 708

[56] References Cited

U.S. PATENT DOCUMENTS

| | | |
|---|---|---|
| 2,855,687 | 10/1958 | Price ........................................ 33/555.3 |
| 3,754,335 | 8/1973 | Culbertson . |
| 3,906,339 | 9/1975 | Leisterer . |
| 4,389,788 | 6/1983 | Balogh et al. ........................... 33/555.1 |
| 4,729,174 | 3/1988 | Caron et al. . |
| 5,035,554 | 7/1991 | Nickols . |
| 5,263,258 | 11/1993 | Dobler et al. . |
| 5,421,101 | 6/1995 | Rank ........................................ 33/831 |

FOREIGN PATENT DOCUMENTS

| | | | |
|---|---|---|---|
| 57-10408 | 1/1982 | Japan .................................... 33/555.1 |
| 57--184904 | 11/1982 | Japan .................................... 33/555.1 |
| 61-213622 | 9/1986 | Japan .................................... 33/555.1 |
| 1776974 | 11/1992 | U.S.S.R. ................................ 33/555.1 |
| 2087561 | 5/1982 | United Kingdom .................. 33/555.1 |
| 2185818 | 7/1987 | United Kingdom .................. 33/555.3 |

*Primary Examiner*—Andrew H. Hirshfeld
*Attorney, Agent, or Firm*—Donald R. Schoonover

[57] ABSTRACT

An electronic radius gauge including a base with an inverted U-shaped configuration having a horizontal top post, a pair of side posts each coupled to opposite ends of the top post and depending therefrom, and a vertically oriented bore centrally formed in the top post. The base adapted to be removably situated on a curvature with an associated radius wherein both side posts rest thereagainst. Also included is a control housing with a probe comprising a rod. The rod is adapted to be slidably insertable through the bore and further abut the curvature. A distance measuring mechanism is situated within the control housing and is adapted to calculate a distance the post has slid up or down with respect to an equilibrium position. A display is situated on a front face of the control housing for depicting a plurality of numbers. Finally, a control mechanism is situated within the control housing and connected to the distance measuring mechanism, the display, and a power source. The control mechanism is adapted to calculate and allow the display to depict the radius of the curvature.

15 Claims, 4 Drawing Sheets

ELECTRONIC RADIUS GAUGE

BACKGROUND OF THE INVENTION

1. Field of the Invention

The present invention relates to an electronic radius gauge and, more particularly, to a device for determining the radius of a convex or concave surface.

2. Description of the Related Art

The use of radius measuring devices is known in the prior art. More specifically, radius measuring devices heretofore devised and utilized for the purpose of determining the radius of a curve are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,035,554 to Nickols; U.S. Pat. No. 3,906,339 to Leisterer; U.S. Pat. No. 4,729,174 to Caron et al.; U.S. Pat. No. 5,263,258 to Dobler et al.; and U.S. Pat. No. 3,754,335 to Culbertson are provided as being of general interest.

In this respect, the electronic radius gauge according to the present invention substantially departs from the conventional concepts and designs of the prior art and, in so doing, provides an apparatus primarily developed for the purpose of conveniently determining the radius of a convex or concave curvature.

Therefore, it can be appreciated that there exists a continuing need for a new and improved electronic radius gauge which can be used for conveniently determining the radius of a convex or concave curvature. In this regard, the present invention substantially fulfills that need.

SUMMARY OF THE INVENTION

The improved electronic radius gauge of the present invention, which will be described subsequently in greater detail, essentially comprises a base with an inverted U-shaped configuration having a generally horizontal top post with a rectangular cross-sectional configuration. A pair of opposing side posts are coupled to opposite sides of the top post and depend therefrom. Each side post has a lower extent with each side surface thereof being beveled to form a base. A vertically oriented throughbore is centrally formed through the top post. The base is adapted to be removably situated on a curvature with an associated radius wherein both side posts rest thereagainst. Also included is a control housing with a generally rectangular configuration having a front face, a rear face, a top surface, a bottom surface, and a pair of side edges coupled therebetween defining an interior space. The control housing is rotatably coupled at the bottom face thereof to a top surface of the top post of the base. A throughbore, axially aligned with the bore of the top post, is formed in both the bottom surface and top surface of the control housing. A probe is included comprising an elongated cylindrical rod with a planar top end and a conical bottom end with a point thereon. The probe is adapted to be slidably insertable through the axially aligned bores of both the base and control housing. For measuring the distance the probe moves in relation to the device, a distance measuring device is situated within the control housing. The distance measuring device comprises an axle rotatably coupled to an interior side of the rear surface of the control housing and extended adjacent to the probe. A cylindrical bushing is situated on an outboard end of the axle for abutting the probe. Such construction allows the axle to coincidently rotate upon the sliding of the probe within the throughbore. An insulative disc is axially coupled to the axle between the rear face and the bushing with the disc having a plurality of spaced metal wires radially situated on the surface thereof. The metal wires are positioned thereon with minute spaces therebetween. A sensor is coupled to the bottom surface of the control housing adjacent to the disc. The sensor is adapted to detect the precessing of the wires and therefrom calculate a distance the post has been axially displaced with respect to an equilibrium position thereof. For viewing purposes, a display is situated on the front face of the control housing. The display consists of a light emitting diode digital display adapted to depict a plurality of numerical digits. Finally, a control mechanism is situated within the control housing and connected to the sensor, display, and a power source. The control mechanism is adapted to allow the resetting of the equilibrium position which is defined by the point of the caliper post being positioned flush with the lower extents of the side posts upon the depression of a reset key. The control mechanism is further adapted to calculate the radius of the curvature upon movement of the probe to a position wherein the apex abuts the curvature. The control mechanism is also adapted to allow the display to depict the radius of the curvature in meters, upon the positioning of a unit switch in a first orientation, and inches, upon the positioning of the unit switch in a second orientation thereof.

Simply and briefly stated, the present invention, among other things, adds an electronic display to a radius gauge for calculating the radius of curvature of a convex or concave surface and selectively displaying that radius of curvature in inches or metric units.

There has thus been outlined, rather broadly, the more important features of the invention in order that the detailed description thereof that follows may be better understood, and in order that the present contribution to the art may be better appreciated. There are, of course, additional features of the invention which will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should be not regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

PRINCIPAL OBJECTS AND ADVANTAGES

It is therefore an object of the present invention to provide a new and improved electronic radius gauge which has all the advantages of the prior art radius measuring devices and none of the disadvantages.

It is another object of the present invention to provide a new and improved electronic radius gauge which may be easily and efficiently manufactured and marketed.

It is a further object of the present invention to provide a new and improved electronic radius gauge which is of a durable and reliable construction.

An even further object of the present invention is to provide a new and improved electronic radius gauge which is susceptible of a low cost of manufacture with regard to both materials and labor, and which accordingly is then susceptible of low prices of sale to the consuming public, thereby making such electronic radius gauge economically available to the buying public.

Still yet another object of the present invention is to provide a new and improved electronic radius gauge which provides in the apparatuses and methods of the prior art some of the advantages thereof, while simultaneously overcoming most, if not all, of the disadvantages normally associated therewith.

Still another object of the present invention is to conveniently determine the radius of a convex or concave curvature.

Lastly, it is an object of the present invention to provide a new and improved electronic radius gauge including a base with an inverted U-shaped configuration having a top post, a pair of side posts each coupled to opposite ends of the top post and depending therefrom, and a generally vertically oriented throughbore centrally formed in the top post. The base is adapted to be removably situated on a curvature with an associated radius as both side posts rest thereagainst. Also included is a control housing with a probe comprising a rod. The rod is adapted to be slidably insertable within and through the throughbore and, further, to abut the curvature of the surface being measured. A distance measuring mechanism, situated within the control housing, is adapted to calculate a distance the post has been axially displaced with respect to an equilibrium position, namely a planar surface (i.e., a surface having an infinite radius of curvature). A display is situated on a front face of the control housing for depicting a plurality of numerical digits. Finally, a control mechanism is situated within the control housing and connected to the distance measuring mechanism, display, and a power source. The control mechanism is adapted to calculate and cause the display to depict the radius of the curvature of a surface being measured.

These, together with other objects of the invention along with the various features of novelty which characterize the present invention, are pointed out with particularity in the claims annexed hereto and forming a part of this disclosure. For a better understanding of the invention, its operating advantages, and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DETAILED DESCRIPTION OF THE INVENTION

Figure 1:
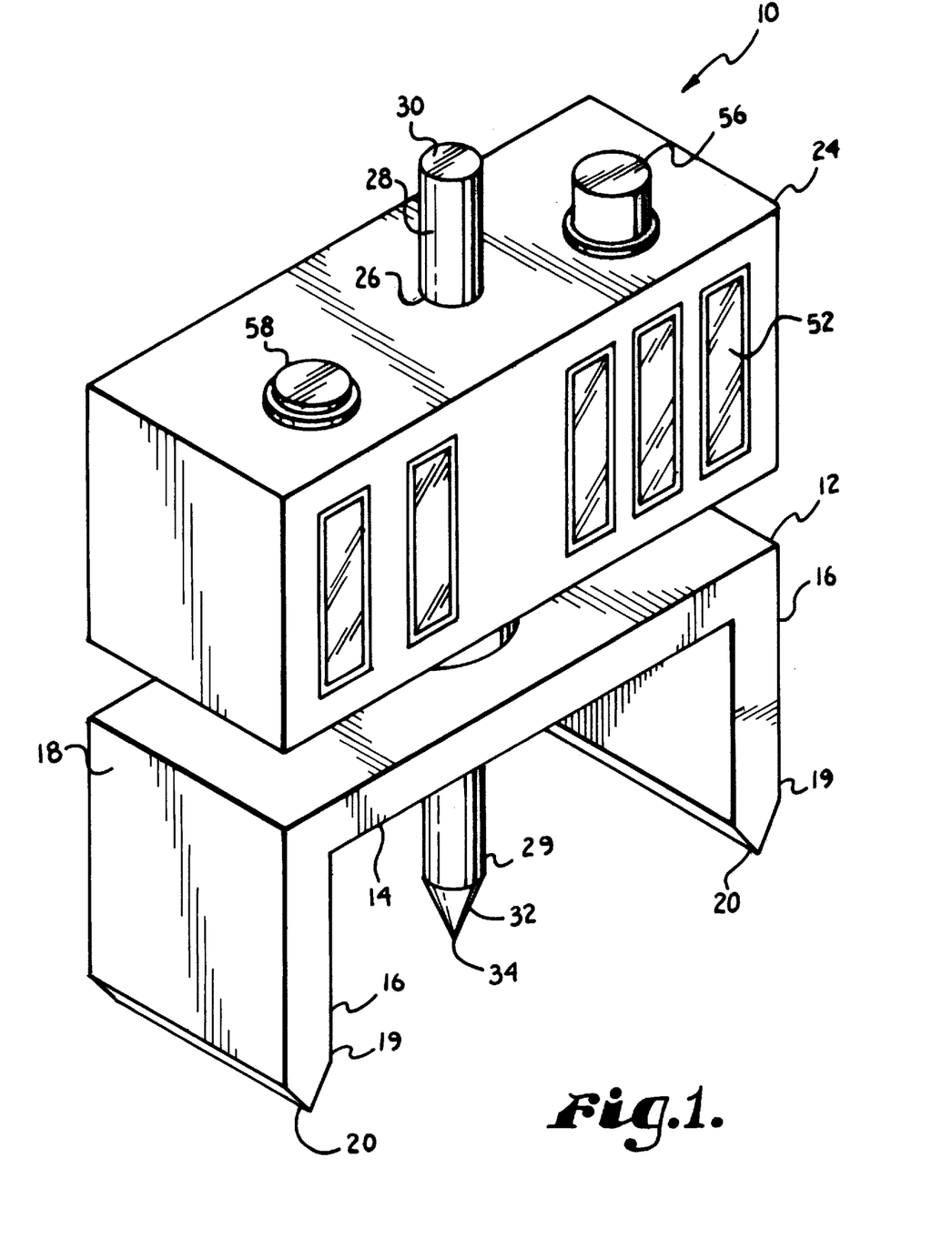
FIG. 1 is a perspective illustration of an electronic radius gauge constructed in accordance with the principles of the present invention.

With reference now to the drawings, and in particular to FIG. 1 thereof, a new and improved electronic radius gauge embodying the principles and concepts of the present invention and generally designated by the reference numeral 10 will be described.

The present invention, the new and improved electronic radius gauge, is comprised of a plurality of components. Such components in their broadest context include a base 12, a control housing 24, a probe 28, a distance measuring device 38, a display 52, and a control mechanism 54. Such components are individually configured and correlated with respect to each other so as to attain the desired objectives.

Figures 2, 3:
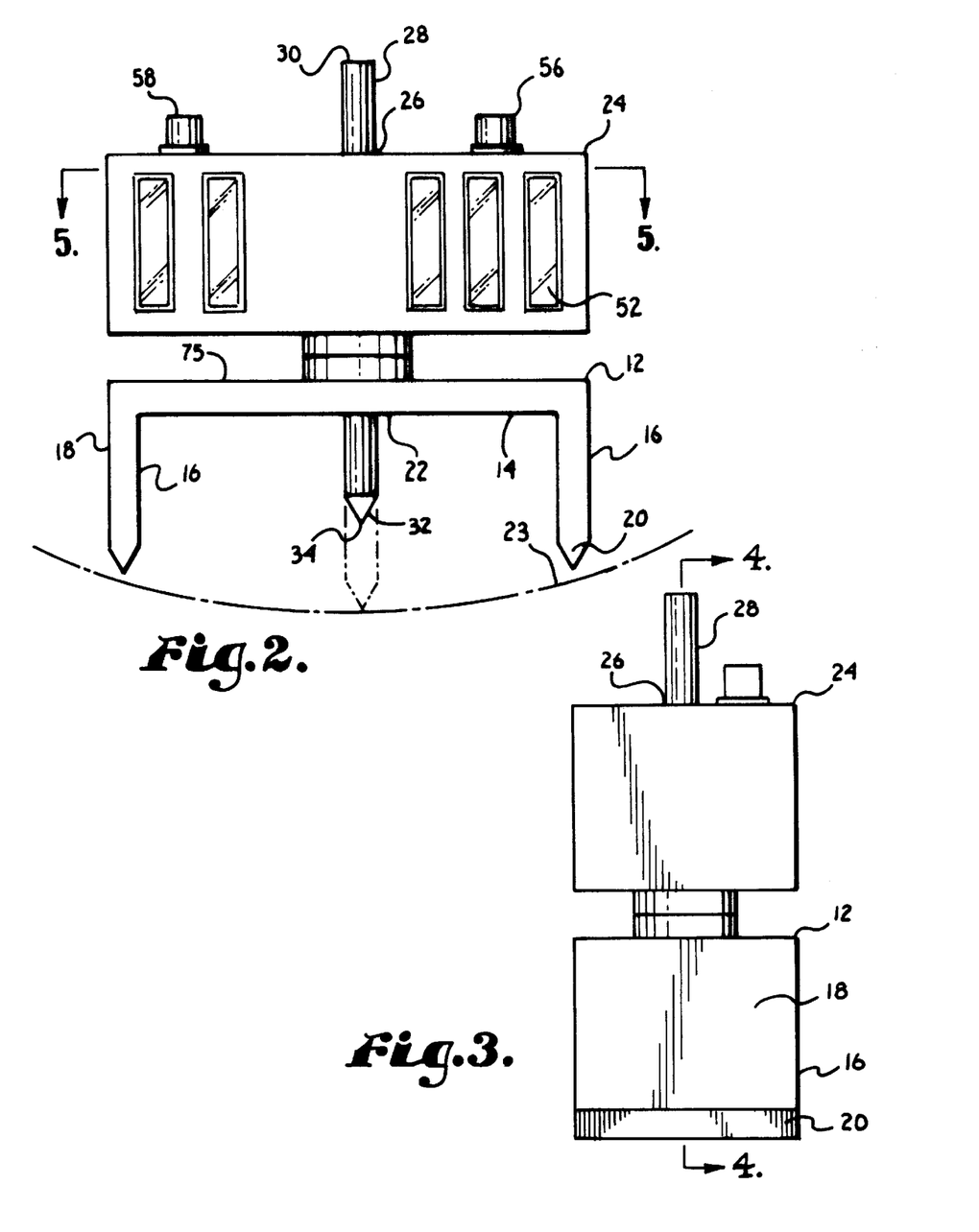
FIG. 2 is a reduced front elevational view of the electronic radius gauge.
FIG. 3 is a reduced side elevational view of the electronic radius gauge.

More specifically, it will be noted that the base 12 of the system 10 of the present invention includes an inverted U-shaped configuration having a cross member 14 with a generally rectangular cross-sectional configuration. A pair of side members 16 are each coupled to opposite ends of the cross member 14 and depend therefrom. Each side member 16 has a top portion 18, desirably having a rectangular configuration, and a lower portion 19, with each side surface thereof being beveled, tapered, or otherwise configured to form a reference portion 20 adapted to operably provide a sharp point or edge situated at a distal end thereof. Preferably, the reference portion 20 is constructed of a rugged material, such as 0.5" thick tool steel 4140 or 1552 heat treated to a rockwell factor of 50–70, or other suitable substance. A throughbore 22 is centrally formed through the cross member 14 as shown in FIG. 2. The reference portion 20 is adapted to be removably situated on a convex cylindrical or spherical curvature, as shown by the phantom line designated by the numeral 25 in FIG. 4, with an associated radius, or a concave cylindrical curvature as shown by the phantom line designated by the numeral 23 in FIG. 2, with an associated radius, wherein both side members 16 rest thereagainst. Preferably, the length of each of the side members 16 is about one-half the spacing between the side members 16 in order for the reference portion 20 to be reliably situated relative to the curvature 23 of a cylindrical concave structure or the curvature 25 of a cylindrical or spherical convex structure. It is to be understood that the various components of the electronic radius gauge 10 are dimensioned as needed for measuring a predetermined range of radii by the device 10.

The device 10 also includes the control housing 24 having a generally rectangular configuration having a front wall 61, a rear wall 63, a top wall 65, a bottom wall 67, and a pair of side walls 69, 71 situated therebetween defining an interior space 73. The bottom wall 67 is rotatably coupled to a top surface 75 of the cross member 14. A throughbore 26, axially aligned with the throughbore 22, is formed in both the bottom wall 67 and the top wall 65 of the control housing 24.

The probe 28 generally comprises an elongated cylindrical rod 29 having a first or top end 30 and a second or bottom end 32 with an apex 34. The apex 34 may be constructed of suitable materials that permit periodic sharpening thereof in order to afford optimal precision thereof as hereinafter described. The probe 28 is adapted to be slidably insertable into and through the axially aligned throughbores 22, 26 of the cross member 14 and the control housing 24. Preferably, the probe 28 extends above the top wall 65 of the control housing 24 a distance of approximately one-third of its entire length for measuring small curvatures and allowing a user to easily utilize the probe 28 with both convex and concave curvatures. The throughbores 22, 26 are preferably lined with a thin bushing 36 configured to operably preclude precarious sliding of the probe 28 therethrough.

Figure 4:
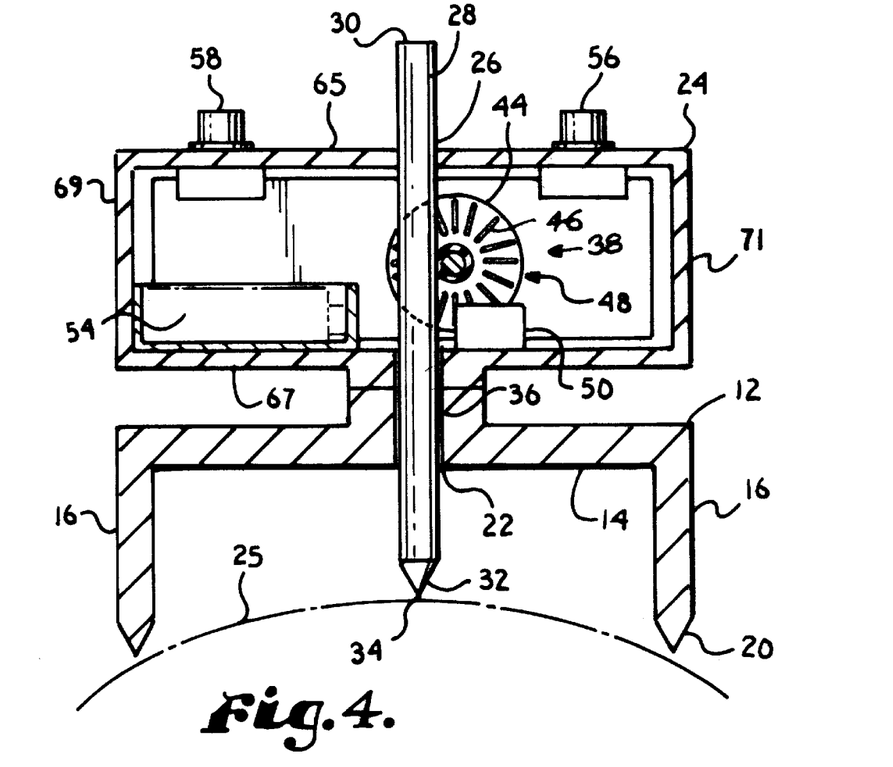
FIG. 4 is a reduced cross-sectional view of the electronic radius gauge, taken along line 4—4 of FIG. 3.
Figure 5:
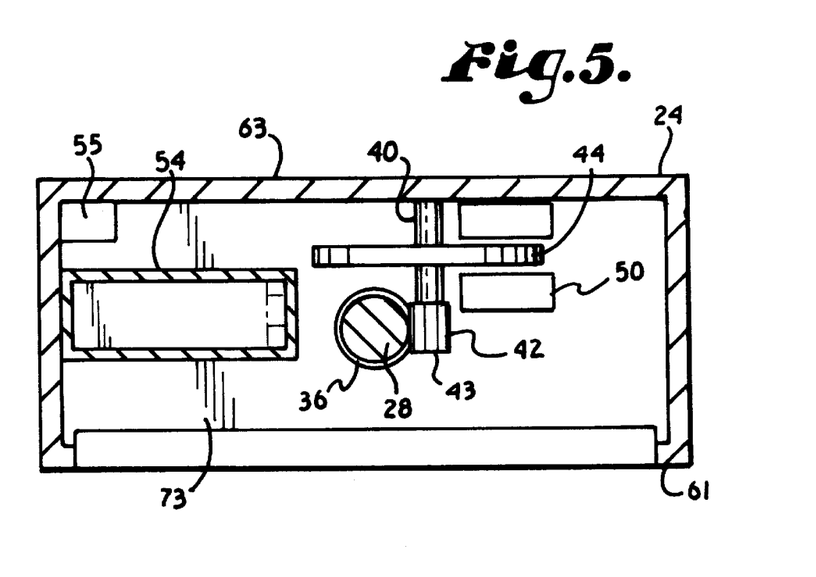
FIG. 5 is a cross-sectional view of the electronic radius gauge, taken along line 5—5 of FIG. 2, according to the present invention.

As best shown in FIGS. 4 and 5, the distance measuring device 38, situated within the control housing 24, is configured to operably measure the distance that the probe 28 is displaced relative to the cross member 14. The distance measuring device 38 comprises an axle 40 rotatably coupled to the control housing 24, generally interiorally to the rear wall 63 thereof, and extended adjacent to the probe 28. A cylindrical bushing 42 is situated on an outboard end 43 of the axle 40 for abutting engagement with the probe 28 such that the axle 40 is caused to coincidently rotate in response to axial displacement of the probe 28 through the bores 22, 26. A disc 44, constructed of electrically insulative material, is axially coupled to the axle 40 between the rear wall 63 and the bushing 42. The disc 44 has a plurality of spaced electrical conductors 46 radially situated on the surface thereof. The conductors 46 are positioned thereon with minute separations 48 therebetween, as indicated in FIG. 4. A sensor 50, coupled generally to the bottom wall 67 of the control housing 24, is spaced adjacent to the disc 44. The sensor 50 is adapted to detect the precessing of the conductors 46 and therefrom calculate a distance that the probe 28 has been displaced relative to an equilibrium position thereof.

For viewing purposes, the display 52 is situated on the control housing 24, generally on the front wall 61 thereof. The display 52 generally consists of a light emitting diode digital display adapted to depict a plurality of numerical digits, or other suitable arrangement.

The control mechanism 54 is situated within the control housing 24 and is communicatively connected to the sensor 50, the display 52, and a power source 55, such as a lithium battery or other suitable arrangement. The control mechanism 54 is adapted to allow the resetting of the equilibrium position, which is defined as the configuration wherein the apex 34 is positioned flush or colinearly with the reference portions 20 of the side members 16 upon the depression of a reset key 56, or other suitable arrangement. If desired, an optional block (not shown) having a planar surface may be used for facilitating calibration of the device 10 for applications wherein a uniformly flat surface may not be readily available. The control mechanism 54 is adapted to automatically calculate the radius of the curvature 23 being measured upon displacement of the probe 28 to a new position wherein the lower portions 19 and the apex 34 simultaneously abut the curvature 23 or 25. The control mechanism 54 is configured to operably cause the display 52 to depict the radius of the curvature 23 being measured in meters, or other suitable distance units, upon the positioning of a units switch 58 in a first orientation and different distance units, such as inches for example, upon repositioning of the units switch 58 to a second orientation thereof.

In an application of the invention, the device 10 is first calibrated by resting the side members 16 and the probe 28 on a uniform planar surface and depressing the reset key 56. The device 10 may be configured to be manually activated by a switching arrangement, to be automatically activated by displacement of the probe 28, or other suitable arrangement as desired. Once calibrated, the device 10 retains that calibration until subsequently similarly recalibrated. The control mechanism 54 determines the radius of curvature, "r", by solving the equation:

$$r = \frac{c^2 + 4d^2}{8d}$$

where "c" is the chordal distance between the reference portions 20 and "d" is the displacement of the apex 34 from the equilibrium reference position. The probe 28 is displaced away from the cross member 14 by surfaces having convex curvature 23 (positive values) and toward the cross member 14 by surfaces having concave curvature 23 (negative values). Applications of the present invention indicate that the device 10 is capable of measuring and displaying a radius of curvature to an accuracy of ±0.001 inch.

As the probe 28 is being displaced, the control mechanism 54 provides continuous readout of the radius of a curvature 23 on the display 52. While being deployed, the control housing 24 may be rotated with respect to the cross member 14 in order to provide a user with an optimal viewing perspective of the display 52. If the probe 28 is not displaced within a certain predetermined time period, within one minute for example, the control mechanism 54 may be configured to operatively shut down to thereby preserve and prolong the life of energy stored in the power source. Such a feature is obviously desirable for making a multiplicity of subsequent calculations and for conserving battery power.

Figure 6:
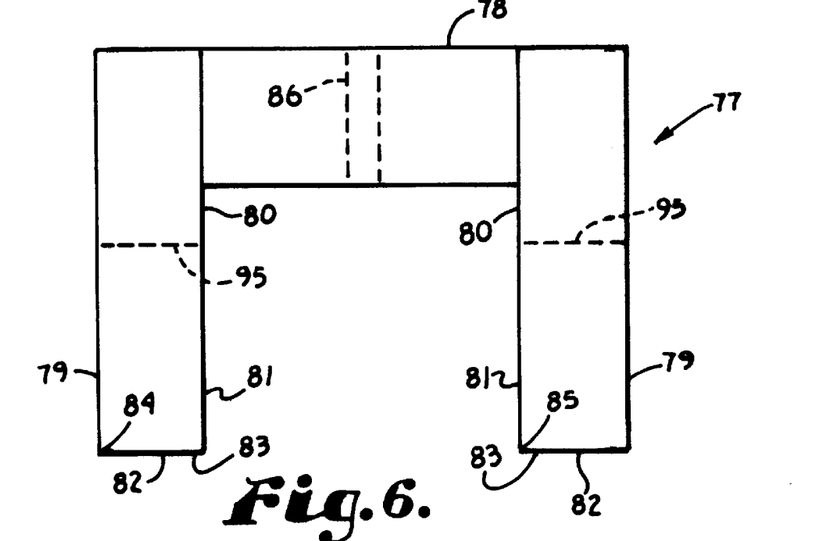
FIG. 6 is a side elevation view of a modified embodiment of the electronic radius gauge, according to the present invention.
Figure 7:
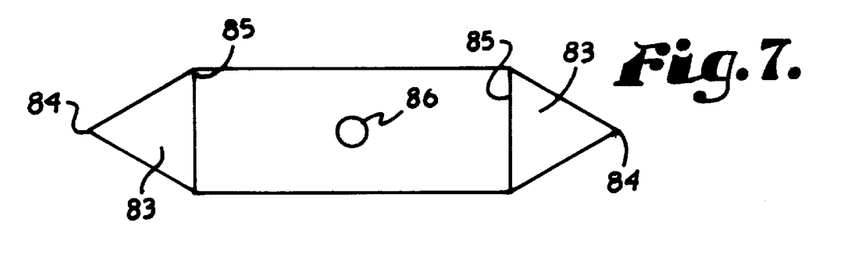
FIG. 7 is a bottom plan view of the modified embodiment, taken along line 7—7 of FIG. 6.

Modified embodiments in accordance with the present invention are shown in FIGS. 6 through 9, and are generally designated by the numerals 77 and 91, respectively. Many of the characteristics of the modified embodiment 77 are substantially similar to those of the previously described embodiment 10 and are not reiterated here in detail. The device 77 includes an inverted U-shaped configuration having a cross member 78 with a pair of side members 79 coupled to opposite ends of the cross member 78 and depend therefrom, as shown in FIG. 6. Each side member 79 has a top portion 80 and a lower portion 81 configured to form a reference portion 82, such as a triangularly shaped foot 83 adapted to operably provide a sharp or well-defined apex 84 and a sharp or well-defined edge 85 at distals ends of the side member 79, as shown in FIG. 7. The triangular shaped feet 83 in FIG. 7 are shown oriented such that the apexes 84 are directed away from each other. A throughbore 86 is centrally formed through the cross member 78 as shown in FIG. 6 for aligning with other bores or orifices and for slidably receiving a probe therethrough as hereinbefore described.

The reference portions 82 are adapted to be removably situated on a convex cylindrical or spherical curvature wherein the edges 85 rest thereagainst, or removably situated on a concave cylindrical or spherical curvature wherein the apexes 84 rest thereagainst. The units switch 58 may include additional selective positions to not only accommodate the choice of different distance units as hereinbefore described but also to communicate to the control mechanism 54 which feature is being used for the curvature measurement—the apexes 84 or the edges 85—pursuant to the radius of curvature formula hereinbefore described wherein the chordal distance thereof is the respective distance between the apexes 84 or the perpendicular distance between the edges 85, as appropriate.

Figure 8:
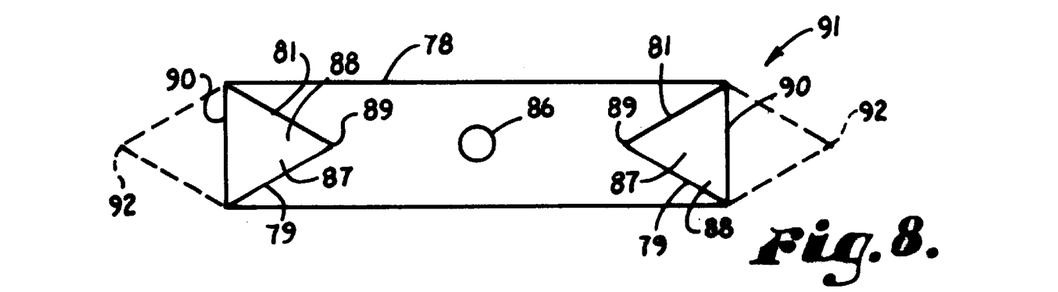
FIG. 8 is a bottom plan view, similar to FIG. 7, of a variation of the modified embodiment.

The modified embodiment 91 is shown in FIG. 8, numeral, wherein the side members 79 have lower portions 81 configured to form reference portions 87, such as triangularly shaped feet 88 adapted to operably provide sharp or well-defined apexes 89 and sharp or well-defined edges 90 at distal ends of the side members 79 wherein the apexes 89 are directed toward each other. The reference portions 87 are adapted to be removably situated on a convex cylindrically or spherically shaped surface wherein the apexes 89 rest thereagainst, or removably situated on a concave cylindrically shaped surface wherein the edges 90 rest thereagainst. Again, and perhaps in addition to the foregoing description, the units switch 58 may include additional selective positions to communicate to the control mechanism 54 which feature is being used for the curvature measurement—the apexes 89 or the edges 90—pursuant to the radius of curvature formula hereinbefore described wherein the chordal distance thereof is the respective distance between the apexes 89 or the perpendicular distance between the edges 90, as appropriate.

If desired, the gauge 10 may be configured whereby the configuration 77 shown in FIG. 6 and the configuration 91 shown in FIG. 8 may be interchangeable, to thereby provide the capability of utilizing the apexes 84 for concave cylindrically and spherically shaped surfaces, and the apexes 89 for convex cylindrically and spherically shaped surfaces. Preferably, the distance between the apexes 84 is equal to the distance between the edges 90, and the distance between the apexes 89 is equal to the distance between the edges 85.

Further, the configuration shown in FIG. 8 may be further modified such that each of the feet 88 are diamond shaped such that the feet 88 have apexes 89, directed toward each other, as well as apexes 92, directed away from each other and corresponding to the apexes 84, as indicated by the phantom lines designated by the numeral 93 in FIG. 8. In that event, the units switch 58 may include additional selective positions for communicating to the control mechanism 54 which feature is being used for the curvature measurement—the apexes 89 or the apexes 92, pursuant to the radius of curvature formula hereinbefore described wherein the chordal distance thereof is the respective distance between the apexes 89 or the distance between the apexes 92, as appropriate.

Figure 9:
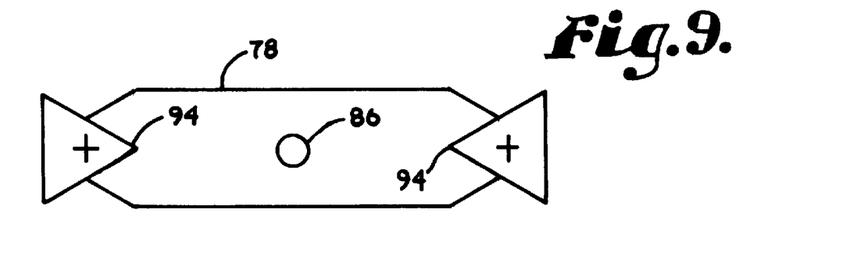
FIG. 9 is a bottom plan view, similar to FIG. 7, of another variation of the modified embodiment of the electronic radius gauge, according to the present invention.

As a further variation of the present invention, the lower portions 81 may be rotatable relative to their respective upper portions 80, as suggested by the dashed lines designated by the numeral 95 in FIG. 6. In that event, the lower portions 81 may be positioned such that certain apexes 94 thereof may be rotated toward each other for measuring the curvature of cylindrically and spherically shaped convex surfaces, as shown in FIG. 9, and rotated away from each other, similar to that shown in FIG. 7, for measuring cylindrically and spherically shaped concave surfaces. Of course, the units switch 58 would be configured and positioned accordingly, as hereinbefore described.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent is as follows:

1. An electronic radius gauge device for measuring a radius of curvature of an arcuate surface, comprising:

(a) a body having an inverted U-shaped configuration including a cross member, a pair of side members coupled to opposite ends of said cross member and depending therefrom, and a first throughbore formed through said cross member, wherein said body is configured to be operably removably situated such that said side members operably rest against the arcuate surface;

(b) a control housing having a top wall with a second throughbore, and a bottom wall with a third throughbore axially aligned with said second throughbore, wherein said bottom wall is rotatably coupled to said cross member such that said first throughbore is axially aligned with said second and third throughbores;

(c) a probe comprising an elongated rod having an apex wherein said probe is configured to be axially displaceable into and through said first, second and third throughbores from a selective calibration configuration thereof;

(d) a distance measuring mechanism including an axle rotatably coupled to said control housing and extending adjacent to said probe, a cylindrically shaped bushing situated on said axle and configured to abuttingly engage said probe such that said axle cooperatively rotates upon axial displacement of said probe through said first and second and third throughbores, an insulative disc axially coupled to said axle wherein said disc includes a plurality of spaced conductors radially situated on a surface thereof with minute spaces therebetween, and a sensor communicatively coupled to said disc enabling said sensor to detect precessing of said conductors such that a magnitude of displacement of said probe from said calibration configuration may be determined;

(e) a display, mounted to said control housing, configured to depict a plurality of numerical digits;

(f) a power source configured to operably provide power for said device; and (g) a control arrangement, communicatively connected to said sensor, said display, and said power source and configured to calculate the radius of curvature of the arcuate surface upon displacement of said probe from said calibration configuration to a position wherein said apex abuttingly engages the arcuate surface, said control arrangement including:

(1) a reset key configured to operably reset said display to correspond with said calibration configuration upon depression thereof, and (2) a units switch having first and second configurations wherein said display is caused to depict the radius of the curvature in first distance units upon positioning of said units switch in said first configuration and in second distance units upon positioning of said units switch in said second configuration.

2. An electronic radius gauge comprising, in combination:

a base having an inverted U-shaped configuration including a horizontal top post having a rectangular configuration and a top surface; a pair of side posts each coupled to opposite sides of said top post and depending therefrom, each said side post having a top extent with a rectangular configuration and a lower extent with each side surface thereof being beveled to form a triangular base; and a vertically oriented first bore centrally formed through said top post; said base being adapted to be removably situated on a curvature with an associated radius wherein both said side posts rest thereagainst;

a control housing with a generally rectangular configuration having a front face, a rear surface having an interior side, a top surface having a second bore, a bottom surface having a third bore, and a pair of side edges coupled therebetween defining an interior space, said control housing rotatably coupled at said bottom surface thereof to said top surface of said top post such that said second and third bores are axially aligned with said first bore;

a probe comprising an elongated cylindrical rod having a conical bottom end with a point thereon, said probe adapted to be slidably insertable through said first and second and third bores;

a distance measuring device situated within said control housing comprising an axle rotatably coupled to said interior side of said rear surface of said control housing and extended adjacently to said probe, a cylindrical bushing situated on an outboard end of said axle adapted to abutting engage said probe such that said axle cooperatively rotates upon the sliding of said probe within said bores, an insulative disc axially coupled to said axle between said rear surface and said bushing wherein said disc has a plurality of spaced metal wires radially situated on a surface thereof with minute spaces therebetween, and a sensor coupled to said bottom surface of said control housing adjacent to said disc such that precessing of said wires is detectable by said sensor to thereby determine displacement of said probe through said bores from an equilibrium position;

a display situated on said front face of said control housing and configured to depict a plurality of numerical quantities;

a power source; and a control mechanism situated within said control housing and connected to said sensor, said display, and said power source wherein said control mechanism includes a reset key and a units switch having a plurality of positions, corresponding to a plurality of respective measurement units, and is adapted to (a) selectively permit establishment of said equilibrium position upon manipulation of said reset key, (b) calculate the radius of the curvature based upon displacement of said probe from said equilibrium position to a position wherein the point abuts the curvature, and (c) cause said display to selectively depict the radius of the curvature in units corresponding to the positioning of said units switch in a selected one of said plurality of positions.

3. An electronic radius gauge device for determining the radius of curvature of an arcuate surface, comprising:

(a) a base having an inverted U-shaped configuration including:
  (1) a cross member,
  (2) a pair of opposing side members depending generally perpendicularly from said cross member, and
  (3) an orifice formed through said cross member;

(b) a housing coupled to said base and containing a control mechanism;

(c) a probe configured to be operably displaceable axially through said orifice from an equilibrium position of said probe to a cooperative three-point contact with the arcuate surface by said side members and said probe;

(d) a distance measuring mechanism, mounted to said control housing and including a sensor configured, cooperatively with said control mechanism, to operably determine a magnitude of displacement of said probe from said equilibrium position to said three-point contact with the arcuate surface; said distance measuring mechanism having an axle rotatably coupled to said housing and extended adjacent to said probe;

(e) a cylindrical bushing situated on an outboard end of said axle and configured to abuttingly engage said probe such that said axle cooperatively rotates as said probe is slidingly displaced through said orifice;

(f) an insulative disc, axially coupled to the axle and having a plurality of spaced conductors radially situated thereon with minute spaces therebetween; and (g) a sensor spaced adjacently to said disc and communicatively coupled to said spaced conductors and said control mechanism; and (h) a display configured, cooperatively with said control mechanism, to operably depict the radius of curvature of the arcuate surface based on said magnitude of displacement of said probe.

4. An electronic radius gauge device as set forth in claim 3, wherein said housing is rotatably coupled to said cross member.

5. An electronic radius gauge as set forth in claim 3, wherein said control mechanism is configured to operably cause said display to depict the radius of curvature of the arcuate surface in a selected one of a plurality of distance units.

6. An electronic radius gauge device as set forth in claim 3, including:

(a) a reset mechanism; and (b) said control mechanism being configured to recalibrate said distance measuring mechanism by activation of said reset mechanism as said probe assumes said equilibrium position.

7. An electronic radius gauge device as set forth in claim 3, wherein each said side member has a lower portion with a triangular base.

8. An electronic radius gauge device as set forth in claim 7, wherein an apex of each said trangular base is directed away from a corresponding apex on the other.

9. An electronic radius gauge device as set forth in claim 7, wherein an apex of each said trangular base is directed toward a corresponding apex on the other.

10. An electronic radius gauge device as set forth in claim 7, wherein corresponding apexes of each said trangular base may be selectively oriented toward or away from each other and wherein said control mechanism is configured to automatically adapt to the corresponding spacing between said corresponding apexes.

11. An electronic radius gauge, comprising:

a base with an inverted U-shaped configuration having a horizontal top post, a pair of side posts each coupled to opposite sides of said top post and depending therefrom, and a vertically oriented bore centrally formed through said top post, wherein said base is adapted to be removably situated to a curvature with an associated radius wherein both said side posts rest thereon;

a control housing monted on said base and having a front face;

a probe comprising a rod adapted to be slidably insertable through said bore;

a distance measuring mechanism situated within said control housing and including a sensor adapted to sense a distance that said rod has slid up or down through said bore with respect to an equilibrium position of said rod; said distance measuring mechanism further including an axle rotatably coupled to said control housing and extended adjacent to said probe, a cylindrical bushing situated on an outboard end of said axle and adapted to abuttingly engage said probe such that said axle cooperatively rotates upon the sliding of said probe within said bore, an insulative disc axially coupled to said axle wherein said disc has a plurality of spaced metal wires radially situated on a surface thereof with minute spaces therebetween, and a sensor spaced adjacently to, and communicatively coupled to, said disc;

a display, situated on said front face of said control housing and adapted to depict a plurality of numbers;

a power source; and a control mechanism situated within said control housing and connected to said distance measuring mechanism, said display, and said power source wherein said control mechanism is operatively configured to calculate the radius of the curvature based on displacement of said rod from said equilibrium position to abutting engagement with the curvature and to cause said display to depict the radius of the curvature.

12. An electronic radius gauge as set forth in claim 11, wherein said control housing is rotatably coupled to said top post of said base.

13. An electronic radius gauge as set forth in claim 11, further including a units switch having first and second orientations wherein said control mechanism is adapted to depict the radius of the curvature in meters upon the positioning of said units switch in said first orientation and inches upon the positioning of said units switch in said second orientation thereof.

14. An electronic radius gauge as set forth in claim 11, further including a reset key wherein said control mechanism is adapted to establish said equilibrium position of said rod upon depression of said reset key.

15. An electronic radius gauge as set forth in claim 11, wherein each said side post has a top extent with a rectangular configuration and a lower extent wherein each side surface thereof is beveled to form a triangular base.

* * * * *